(12) United States Patent
Papenbreer et al.

(10) Patent No.: US 7,395,123 B2
(45) Date of Patent: Jul. 1, 2008

(54) CONFIGURABLE MODULAR SAFETY SYSTEM

(75) Inventors: Rudolf L. Papenbreer, Wuppertal (DE); Norbert Machuletz, Wetter (DE); Dirk Lorenz, Hagen (DE)

(73) Assignee: Rockwell Automation Germany GmbH & Co KG, Wuppertal (DE)

( * ) Notice: Subject to any disclaimer, the term of this patent is extended or adjusted under 35 U.S.C. 154(b) by 302 days.

(21) Appl. No.: 11/245,929

(22) Filed: Oct. 7, 2005

(65) Prior Publication Data

US 2006/0087773 A1   Apr. 27, 2006

(30) Foreign Application Priority Data

Oct. 8, 2004   (EP) .................................. 04023988

(51) Int. Cl.
*G05B 11/01* (2006.01)
*G06F 11/00* (2006.01)

(52) U.S. Cl. .......................................... 700/21; 714/24
(58) Field of Classification Search ................... 700/79, 700/11, 21; 714/24, 2, 15, 8
See application file for complete search history.

(56) References Cited

U.S. PATENT DOCUMENTS

| | | | | |
|---|---|---|---|---|
| 5,553,237 A | * | 9/1996 | Eisenberg et al. | 714/47 |
| 5,566,092 A | * | 10/1996 | Wang et al. | 702/185 |
| 5,586,124 A | * | 12/1996 | Nicolaidis | 714/736 |
| 5,790,419 A | * | 8/1998 | Matsuda et al. | 700/79 |
| 5,864,657 A | * | 1/1999 | Stiffler | 714/15 |
| 5,984,504 A | * | 11/1999 | Doyle et al. | 700/108 |
| 6,081,085 A | * | 6/2000 | Ohashi et al. | 318/283 |
| 6,218,951 B1 | * | 4/2001 | Colvin | 340/635 |
| 6,550,018 B1 | * | 4/2003 | Abonamah et al. | 714/6 |
| 6,577,918 B1 | * | 6/2003 | Roth | 700/177 |
| 6,647,301 B1 | * | 11/2003 | Sederlund et al. | 700/79 |
| 7,162,311 B2 | * | 1/2007 | Muneta et al. | 700/21 |
| 2002/0186299 A1 | | 12/2002 | Cofer | |
| 2003/0058602 A1 | | 3/2003 | Veil | |
| 2003/0058623 A1 | | 3/2003 | Veil | |
| 2004/0064205 A1 | | 4/2004 | Kloper | |
| 2004/0215354 A1 | * | 10/2004 | Nakamura et al. | 700/21 |

FOREIGN PATENT DOCUMENTS

DE   9417335   12/1994

OTHER PUBLICATIONS

Schleicher Electronic GMBH & Co. KG, Safety Center: Modulare Sicherheits-Kleinsteuerung, Systembeschreibung, May 9, 2003, pp. 3-26, Internet Article.

* cited by examiner

*Primary Examiner*—Thomas K Pham
(74) *Attorney, Agent, or Firm*—Quarles & Brady, LLP; William R. Walbrun

(57) ABSTRACT

A modular safety system for controlling emergency stop applications includes a plurality of inputs, a plurality of output groups, and a plurality of safe relay outputs. The plurality of inputs is assigned to at least one of the output groups. Each output group is configured to control at least one of the plurality of safe relay outputs. The system also includes means for configuring the system and at least three freely programmable output groups.

19 Claims, 4 Drawing Sheets

CONFIGURABLE MODULAR SAFETY SYSTEM

CROSS-REFERENCE TO RELATED APPLICATIONS

This application claims the benefit of European Patent Application No. 04023988.1 filed Oct. 8, 2004, and entitled "Configurable Modular Safety System."

BACKGROUND OF THE INVENTION

The invention relates to a modular safety system for safety control in emergency stop applications and, in particular, to industrial emergency stop applications.

Modular safety systems for safety control in emergency stop applications are, for example, used for the control of robot cells, wherein the access to the robot cell and the operation of said robot must be controlled under various manufacturing conditions. Usually, the inputs to such a modular safety system include an emergency stop switch, a safety gate with an additional monitored door fastening device, safety mats, safety light curtains, and the robot position. Depending on the input conditions, an output signal is created by the modular safety system to switch a safety relay for an emergency stop of the robot. Various other applications in industrial safety control exist.

For simple manufacturing tasks, safety switching devices are very widely spread; however, in fully automated manufacturing plants they are limited for cost reasons or because they do not provide for diagnosis and monitoring in higher order controllers. On the other side, complex failure safe controllers are used in extremely sophisticated manufacturing facilities; however, they are too costly for small and mid-range applications because further programming systems are required resulting in high engineering costs and the handling can only be done be specifically trained staff.

In mid-rage and even in small-range applications, modular safety systems are used due to their cost-effectiveness.

One such modular safety systems is the F-200-system, which is commercially available from Tesch GmbH & Co. KG, Wuppertal. This modular safety system includes a base module, which has two input channels with a single, dual or three-channel activation, independently of one another. Therefore, for example, an emergency stop switch and a safety gate with an additionally monitored door fastening device can be connected, so that each contact can be monitored independently. Also, foot switch mats or safety mats and safety light curtains with relay outputs can be used as initiating devices. The base module monitors the individual channels constantly to check the connection to one another and to check for interruptions. It opens the safety contacts if either an appropriate E-stop or fault condition occurs. The status of input/output and diagnostic information are indicated by LED lamps, signalled by relay contacts and semiconductor outputs, and transmitted to a serial data interface on the front of the module. That base module may be expanded by additional safety input extension modules and/or contact extension modules.

A further example of a known modular safety system is the safety center that is commercially available from Schleicher Elektronik GmbH & Co. KG, D-13597 Berlin and includes a base module and at least one input module. The safety center has two multifunction groups A and B, which can operate as independent devices or be combined with one another. Separate or joint operation of the input circuit groups A and B on the input module is configured with a switch on the front of the base module. Input function selection is done by the use of two rotary switches located in the front plane of the input module.

The known modular safety systems show a disadvantage of limited flexibility so that they are not suited for more complex applications.

It would therefore be desirable to provide a system with a more complex functionality.

SUMMARY OF THE INVENTION

A modular safety system for safety control in emergency stop applications is disclosed that includes a plurality of input channels, a plurality of output groups, and a plurality of safe relay outputs. As such, each input is assigned to at least one of the output groups and each output group controls at least one of the plurality of safe relay outputs. The modular safety system also includes means for configuring the system at least three freely programmable output groups.

In accordance with one embodiment, the system is organized in a modular way, which means it includes at least one input module for inputting the respective input signals from a plurality of sensors, a basic module for controlling the system and at least one output module for controlling the safe relay outputs. For example, each input module may include two independent inputs, wherein each input may include one, two, or three channels.

In according with a further embodiment, each input module includes a configuration means for configuring the input functions and for selecting the desired output groups. In this regard, the configuration means may include a set of rotary switches. In one embodiment, a maximum of ten input modules may be combined with one basic module. Additionally, input modules may be saved in a memory, for example, an EEPROM located in the base module, so that the settings of the configuration means is compared with the memory content at each new start up of the system. In the case that the configuration of the input modules has been changed without proper authorization, the safety system will not start. Further, the current configuration may be programmed in the memory before the first starting of the system using appropriate programming means.

In a further embodiment, internal errors of the safety system are saved into the above mentioned memory, wherein internal errors may be an exceeded synchrony time limit or an unlocked safety input. Furthermore, if not all channels of an input circuit are interrupted and a reset button is pressed, the faults or errors can be deleted by unlocking all input channels simultaneously.

It is contemplated that each output module, (for example, a maximum of six output modules combined with one base module), include a given number of safe relay outputs. The number of safe relay outputs of each output module may be four, wherein, for example, three safe relay outputs are normally open (NO) and one safe relay output is normally closed (NC). Further, each output module may be assigned to one output group.

A wide variety of input functions may be selected by the configuration means for identifying the input signals of the safety sensors of each input. For example, the functions may be a one channel emergency stop, a two channel emergency stop, or a three channel emergency stop. As a further example, the functions may be a safe gate with start up test, a safe gate without start up test, a light curtain, which needs both inputs, a two-hand operation or a mixed input, wherein input 1 of one input module is connected to a two-channel emergency stop and input 2 of that input module is connected to a light curtain.

Further, each input may be assigned to at least one output group. For example, the inputs of a given input module may be assigned to group 1, group 2, group 1+2, group 3, group 1 to 3, group 2+3, or group 1+2+3. This means, for example, in the case that both inputs of one input module are assigned to group 1, that group 1 is active, if all group 1 inputs and input containing group 1, so-called combined inputs, are closed. Further, the output state of at least one of those output groups may be a logical function of the output states of at least one of the other output groups. For example, the output "group 3" may be the following logical function:

(input 1 or group 1) and (input 2 or group 2)=group 3.

This example may be called muting with cross-control.

In accordance with a further embodiment, a so called safe area input may be provided in the configuration means of an input module, which may be defined by the following logical equation:

((input 1 or group 1) and (input 2 or group 2)) or input "safe area"=group 3.

This functionality provides, for example, in a robot application, that the robot will run if it is located in a safe area, regardless of the other inputs. Other logical functions comparable to the above mentioned logical combinations are possible.

Further, delay timer means may be provided, for example, as delay timer modules, so that the switching times of the respective safe relays may be delayed for a given group.

In accordance with another embodiment, the input modules, the basic module, and the output modules are interconnected by a flat band cable, providing for the signal flow from the input modules via the basic module to the output modules.

Further, the basic module or controller module may be provided with an integrated diagnostic interface, for example, an RS 232/485 interface or an alternative device net communication interface. With those interfaces, the safety system may be connected to an external data processing means, for example, a computer.

DETAILED DESCRIPTION OF THE INVENTION

Figure 1:
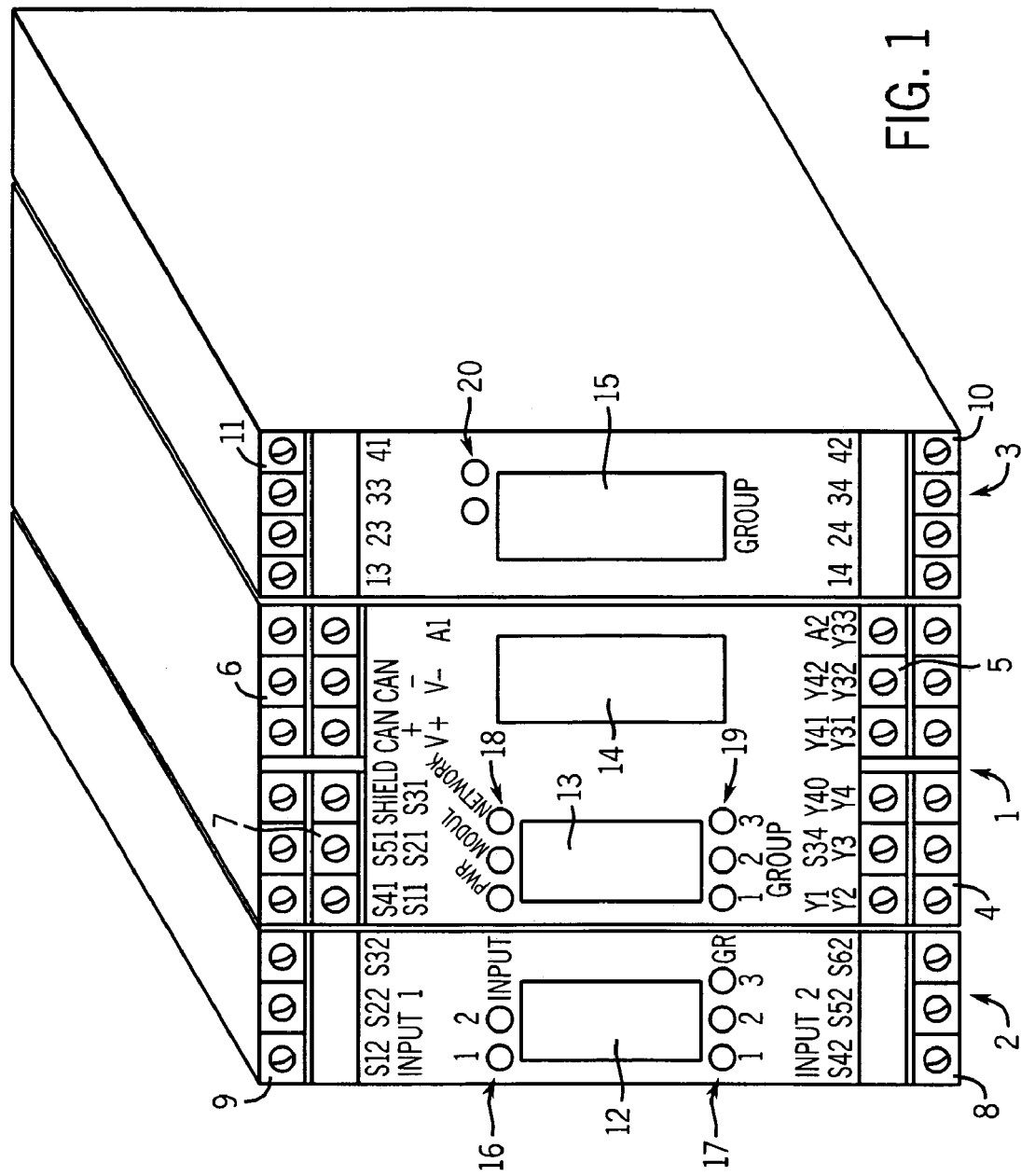
FIG. 1 is a perspective view of a modular safety system including three modules.

Referring to FIG. 1, a modular safety system according to the invention is shown in simplified configuration including a base module 1, an input module 2, and an output module 3. The modules 1, 2, 3 are arranged in a side-by-side fashion on a mounting rail (not shown). The base module 1 includes two lower terminal rows 4, 5 and two upper terminal rows 6, 7 for attaching the necessary cable connections. The input module 2 as well as the output module 3 both includes a lower terminal row 8, 10 and an upper terminal row 9, 11 for attaching the necessary input and output cable connections.

The upper terminal row 9 of the input module 2 serves as a first input, whereas the lower terminal row 8 serves as a second input with, in the example shown, a maximum of three channel activations. The modules 1, 2, 3 are interconnected by two different types of flat cables (not shown) through their sockets 12, 13, 14, and 15. Further, a plurality of LEDs 16-20 in each module serves for information about the state of an associated module 1, 2, 3.

Figure 2:
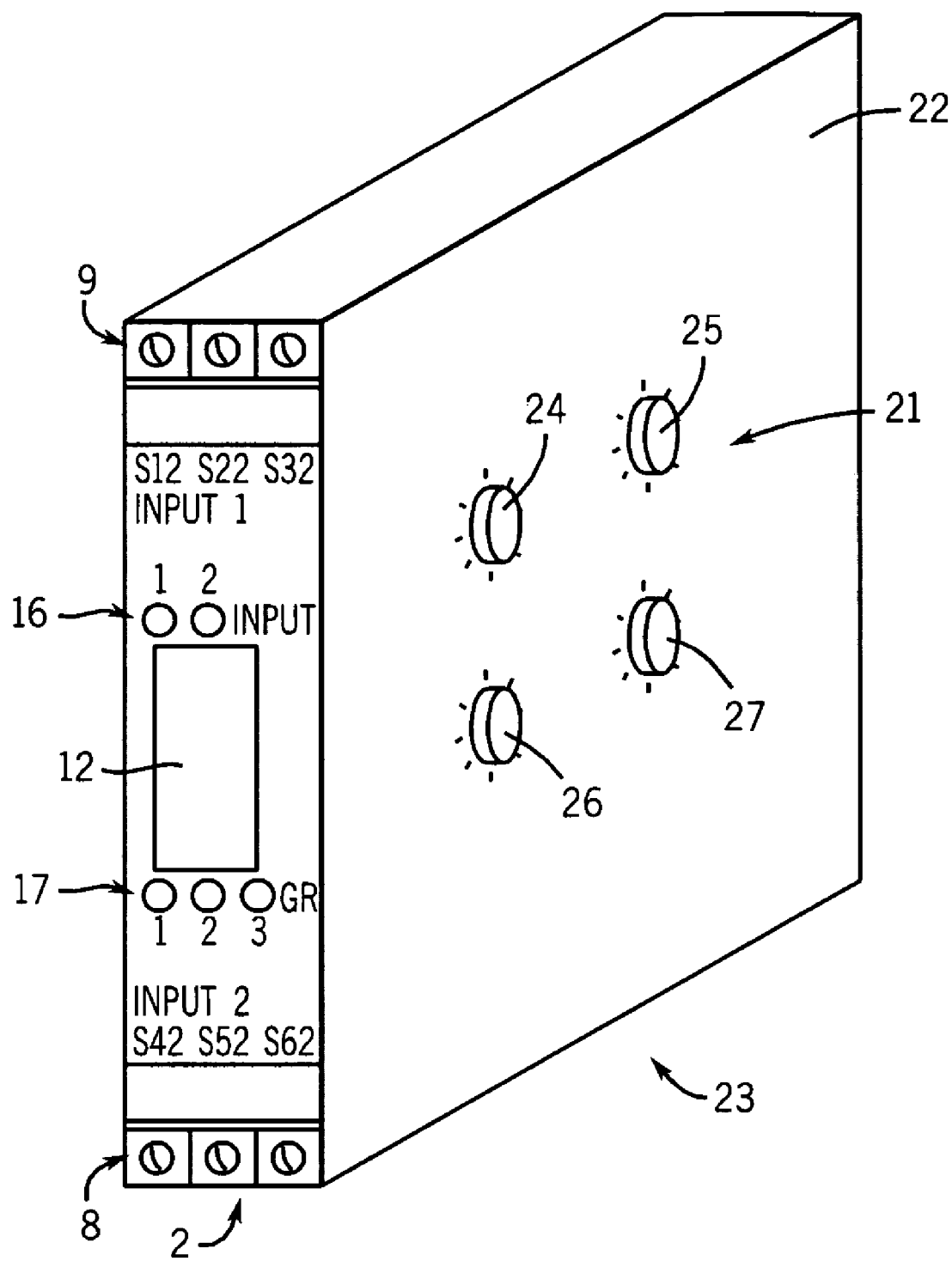
FIG. 2 is a perspective view of an input module with a configuration setting means, located on one side of the input module.

For each input module 2, input and output functions are defined. Therefore, as shown in FIG. 2, the input module 2 includes a setting means 21 in a side wall 22 of the housing 23. In one embodiment, the configuration setting means 21 includes a first pair of rotary switches 24 and 25 and a second pair of rotary switches 26 and 27. As such, the first pair 24, 25 is used to define the input functions and the second pair of rotary switches 26, 27 is used to define the output functions, i.e. the output groups.

As an example, the input functions of the input module 2 include two inputs that function as follows.

TABLE 1

| Function 1 | One channel emergency stop |
| Function 2 | Two channel emergency stop |
| Function 3 | Three channel emergency stop |
| Function 4 | Safe gate with start up test |
| Function 5 | Safe gate without start up test |
| Function 6 | Light curtain (both inputs) |
| Function 7 | Two hand operation |
| Function 8 | Input 1: two channel emergency stop, input 2: light curtain |

Furthermore, Table 2 lists as an example the possible group selections made using "select group" switches 26, 27 that, according to the illustrated example, include setting 0 to setting 8. It should be recognized that the following is for exemplary purposes only, and thus, other numbers of settings are also possible. For example, setting 1 means that both inputs of the respective input module activates the output Group 1, wherein Group 1 is active, if all Group 1 and Group 1 combined inputs are closed.

TABLE 2

| Setting 0 | Logic function |
| Setting 1 | Group 1 |
| Setting 2 | Group 2 |
| Setting 3 | Group 1 + 2 |
| Setting 4 | Group 3 |
| Setting 5 | Group 1 + 3 |
| Setting 6 | Group 2 + 3 |
| Setting 7 | Group 1 + 2 + 3 |
| Setting 8 | (Input 1 or group 1) and (input 2 or group 2) = group 3 (muting with cross-control) |
| Setting 9 | ((Input 1 or group 1) and ((input 2 or group 2)) or input "safe area" = group 3 |

Figure 3:
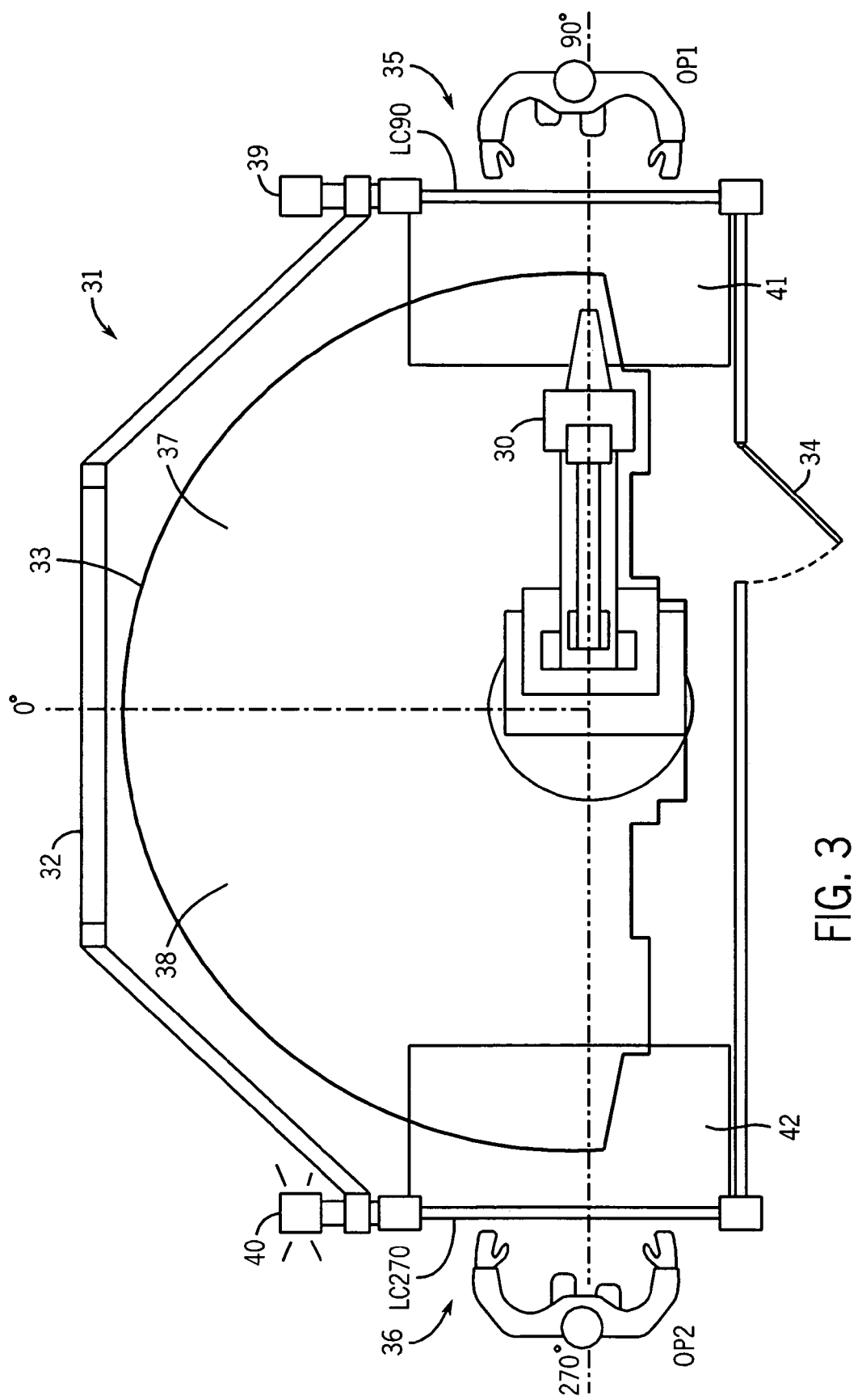
FIG. 3 is a plan view of a robot cell with two areas.

Referring now to FIG. 3, an example of a robot cell with two areas is shown. In FIG. 3, a robot 30 is arranged in a robot cell 31 including a fence 32 surrounding the working space 33 of the robot 30. The fence 32 of the robot cell 31 includes a gate 34 for allowing access to the robot 30. Further, the fence 32 includes two access stations 35, 36 for feeding material to the robot by operators OP1, OP2. Those access stations 35, 36 are located at 90° and 270° assuming a coordinate system with 0° therebetween, as shown in FIG. 3. In other words, the robot 30 can rotate from 90° to 270° through 0°, which is located therebetween, so that the working space 33 of the robot 30 is divided into two areas 37, 38. The access stations 35, 36 are secured by light curtains LC90 and LC270, which are connected to the modular safety system (not shown). Further, two muting lamps 39, 40 are located near the light curtains LC90 and LC270 of the access stations 35, 36. Further, safety mats 41, 42 are provided at the access stations 35, 36.

According to one embodiment, the operation of the robot is limited by the following restrictions, which lead to the truth table as given in Table 3.

If there is no operator at access station 35 (90°) and access station 36 (270°), in other words, no operator has crossed the light curtains LC90 or LC270, there are no restrictions for the robot operation.

If there is no operator present at access station 36 (270°) but operator OP1 has entered access point 35 (90°) by crossing the light curtain LC90, the robot 30 can only operate in the position 270°, i.e., at access station 36 (270°).

If an operator OP2 has entered access station 36 (270°), the robot 30 can only operate in the position 90°, i.e., at access station 35 (90°), otherwise the robot is stopped.

If both operators OP1 and OP2 have entered the respective access stations 35, 36 (90° and 270°), there is no working position for the robot possible without potentially encountering the operators OP1 and OP2, so that the robot operation will come to a stop.

The following truth table depicts this situation in detail and includes the inputs LC270 (light curtain 270°), LC90 (light curtain 90°), RB270 (robot 30 at position 270°) and RB90 (robot at position 90°).

TABLE 3

| LC270 | LC90 | RB270 | RB90 | Output |
|---|---|---|---|---|
| 1 | 1 | 0 | 1 | 1 |
| 0 | 1 | 0 | 1 | 1 |
| 1 | 0 | 0 | 1 | 0 |
| 0 | 0 | 1 | 0 | 0 |
| 0 | 0 | 1 | 0 | 0 |
| 1 | 0 | 1 | 0 | 1 |
| 1 | 1 | 1 | 0 | 1 |
| 0 | 1 | 1 | 0 | 0 |
| x | x | 0 | 0 | ? |
| x | x | 1 | 1 | ? |

Now, in the example described with respect to FIG. 3, the position of the robot 30 is measured by an appropriate sensor and inputted into the safe modular safety system (not shown). Further, signals of the light curtains LC90 and LC270, the safety mats 41, 42, and the Gate 34 are also inputted into the modular safety system (not shown). However, the truth table according to Table 3 only shows the robot position and the light curtains, signals of the safety mats and of the gate are not considered in this example for simplicity and clarity.

Figure 4:
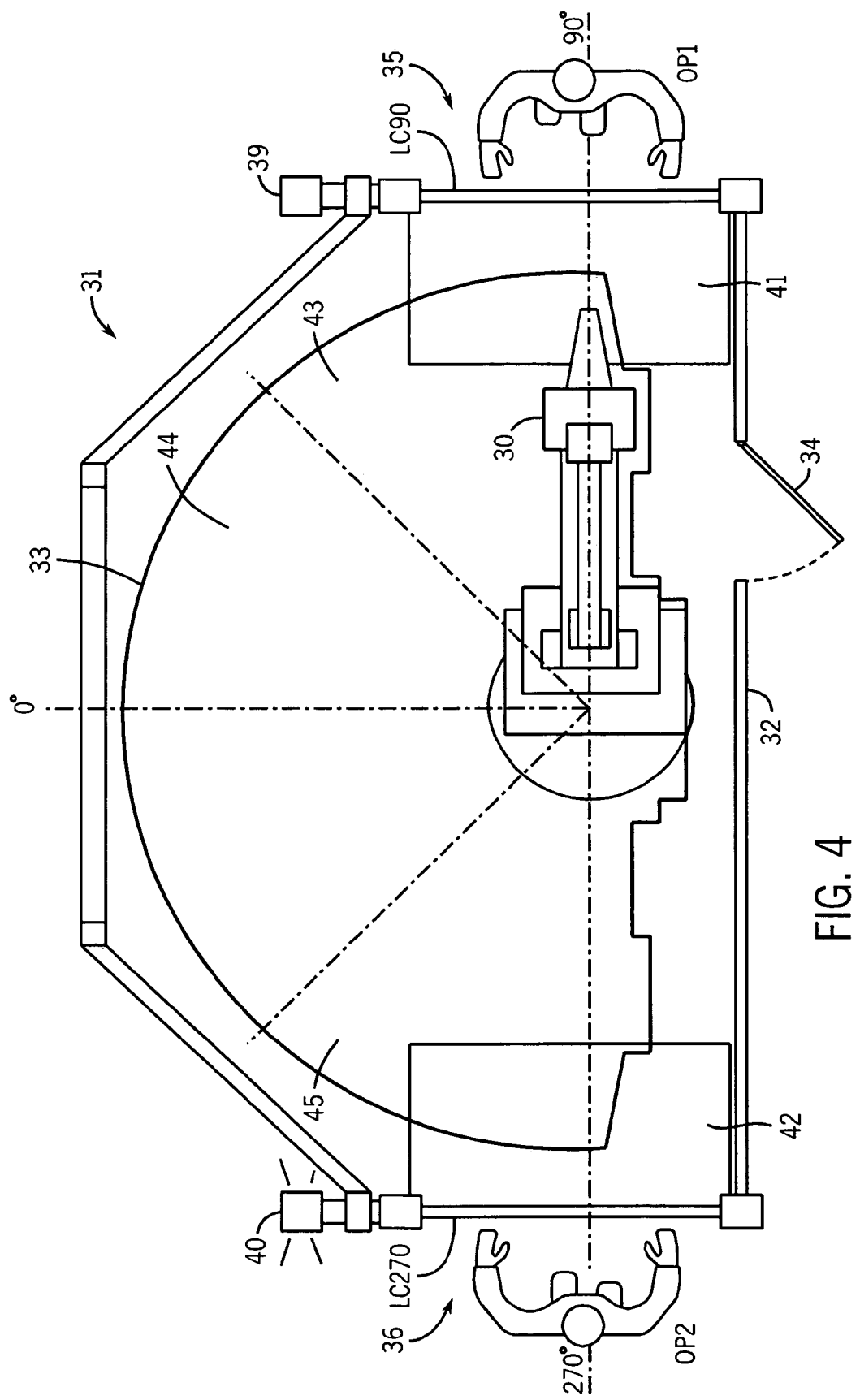
FIG. 4 is a plan view of a robot cell with three areas.

Referring now to FIG. 4, the robot 30 is located again in the robot cell 31, however, now the working space 33 is divided in three working areas 43, 44, and 45. Accordingly, similar reference numbers to those of FIG. 3 are used to identify like components.

Here, an additional safe operating area 44 was added to the working space 33 of the robot, so that the operation of that robot 30 will not be stopped, when the robot is located in the additional safe area 44.

This leads to a truth table as given in Table 4:

TABLE 4

| LC270 | LC90 | RB270 | RB90 | Add safe area | Output |
|---|---|---|---|---|---|
| 1 | 1 | 0 | 1 | 0 | 1 |
| 1 | 0 | 1 | 0 | 0 | 1 |
| 1 | 1 | 1 | 0 | 0 | 1 |
| 0 | 1 | 0 | 1 | 0 | 1 |
| 1 | 0 | 0 | 1 | 0 | 0 |
| 0 | 1 | 1 | 0 | 0 | 0 |
| 0 | 0 | 1 | 0 | 0 | 0 |
| 0 | 0 | 0 | 1 | 0 | 0 |
| x | x | 0 | 0 | 0 | ? |

TABLE 4-continued

| LC270 | LC90 | RB270 | RB90 | Add safe area | Output |
|---|---|---|---|---|---|
| x | x | 1 | 1 | x | ? |
| x | x | 0 | 0 | 1 | 1 |

Here, too, inputs of the safety mats and the gate 34 have not been considered in the above truth table. Such a situation may be complied by using a position signal of the root indicating that the robot is located in the safe area, i.e. a logical one, or that it is not in the safe area, i.e. a logical zero. This signal may be used in the logical equation according to group selection setting 9.

The invention claimed is:

1. A modular safety system for safety control in emergency stop applications, the modular safety system comprising:
    a plurality of inputs, a plurality of output groups and a plurality of safe relay outputs, wherein each input is assigned to at least one of the output groups and each output group controls at least one of the safe relay outputs;
    at least one rotary switch configured to select at least one of the output groups and input functions for the inputs; and
    wherein the plurality of output groups includes at least three freely programmable output groups.

2. The system of claim 1 further comprising at least one input module corresponding to the plurality of inputs, a base module configured to control the system, and at least one output module configured to control the safe relay outputs.

3. The system of claim 2 wherein the at least one input module includes a corresponding configuration means.

4. The system of claim 3 wherein the configuration means is configured to select the input functions and output functions for the plurality of inputs of the at least one input module.

5. The system of claim 4 wherein the at least one input module is individually programmed to at least one of the plurality of output groups.

6. The system of claim 1 further comprising ten input modules and a maximum of twenty inputs.

7. The system of claim 6 further comprising six output modules and a maximum of 24 safe relay outputs.

8. The system of claim 1 further comprising means for controlling muting functionality for controlled access.

9. The system of claim 8 further comprising an individual module housing the means for controlling muting functionality.

10. The system of claim 1 wherein the output state of at least one of the output groups is a logical function of the output state of at least one of the other output groups.

11. The system of claim 1 further comprising at least one safe area functionality.

12. The system of claim 1 further comprising an interface for connecting the system to an external computer system.

13. The system of claim 1 further comprising a timer delay control for setting different switching times for each output group.

14. The system of claim 1 further comprising a memory device for saving the configuration settings of the system.

15. The system of claim 14 wherein the memory device is configured to save internal system errors.

16. The system of claim 15 wherein the internal system errors include an exceeded synchrony time limit, an unlocked safety input, and, if not all channels of an input circuit are interrupted and a reset button is pressed, a reset error.

17. The system of claim 1 further comprising a storage medium that stores settings of the at least one rotary switch and a comparator that compares the setting stored in the storage medium to the setting indicated by the at least one rotary switch.

18. The system of claim 17 wherein the system is configured to not start if the comparator indicates that the input modules have been changed without proper authorization.

19. The system of claim 1 further comprising a second rotary switch; wherein the first, at least one, rotary switch is configured to select the input functions for the inputs and the second rotary switch is configured to select the output groups for the inputs.

* * * * *